Dec. 9, 1969          J. J. HOGAN          3,483,421

ELECTRONIC AREA CORRELATOR TUBE

Filed Feb. 28, 1968          2 Sheets-Sheet 1

INVENTOR
JAMES J. HOGAN
BY:
Oldham & Oldham
ATTORNEYS

United States Patent Office
3,483,421
Patented Dec. 9, 1969

3,483,421
ELECTRONIC AREA CORRELATOR TUBE
James J. Hogan, Akron, Ohio, assignor to Goodyear Aerospace Corporation, Akron, Ohio, a corporation of Delaware
Filed Feb. 28, 1968, Ser. No. 708,919
Int. Cl. H01j 31/26
U.S. Cl. 315—10       11 Claims

ABSTRACT OF THE DISCLOSURE

An electronic tube which generates an amplified, low noise area correlation signal of two images, one of which is an electron image wherein the correlation and gain are performed within a single, solid state sandwich. Specifically, the electrons representing one image impinge on one side of the sandwich, and the photons representing another image impinge on the other side of the sandwich, and the construction of the sandwich is such that maximum current flow therethrough and a minimum potential across the photoconductive portion of the sandwich are achieved when maximum correlation is achieved. Standard phase discriminating and integrating circuitry is associated with the tube to determine when correlation occurs. The sandwich consists of a pair of semiconductor elements placed in side by side relationship whereby one semiconductor allows penetration into its electron-multiplier regions of electrons, and the other semiconductor allows impingement into its photosensitive regions of photons so that when the electron penetrated depletion regions of the electron receptive semiconductor are aligned with the photon penetrated photosensitive regions of the photon receptive semiconductor, a current can flow through both semiconductors. The total number of aligned penetrated areas or regions of the semiconductors thereby create properties within the semiconductors that control the amount of current passing through the semiconductors. The measurement of this current during the nutation of the electron image allows correlation of the images to be possible.

---

Heretofore it has been known that an electron image tube might be used for correlation technique as particularly pointed out in U.S. Patent No. 3,194,511 and U.S. Patent application Ser. No. 232,961, filed Oct. 25, 1962, now Patent No. 3,290,546 for "Electron Image Correlator," and assigned to Goodyear Aerospace Corporation. However, these electron correlation tubes require erase of the patterns stored on the grids. Further, because erase is necessary, an instantaneous or completely up-to-date correlation signal is not possible. Also, real-time control of the reference scene is not possible.

Hence, it is the general object of the present invention to avoid and overcome the foregoing and other difficulties of and objections to prior art practices by the provisions of a solid-state correlation tube which utilizes the photocathode and drift sections of the prior art, but in place of the storage sections utilizes solid state electronic techniques to achieve an instantaneous correlation without erase time, and with higher real-time electronic-image resolution.

A further object of the invention is to provide a hybrid correlation tube wherein the storage area comprises a solid state sandwich consisting of one or more segments, each segment containing one or more solid-state sandwich elements connected in parallel between segment conductors, and wherein each element consists of two sensitive semiconductors separated by a conducting semiconductor or metal placed between the segment conductors such that one sensitive material surface is connected directly or via a semiconducting material to one electrode and the other is similarly connected to another electrode.

For a better understanding of the invention reference should be had to the accompanying drawings wherein.

Figure 1:
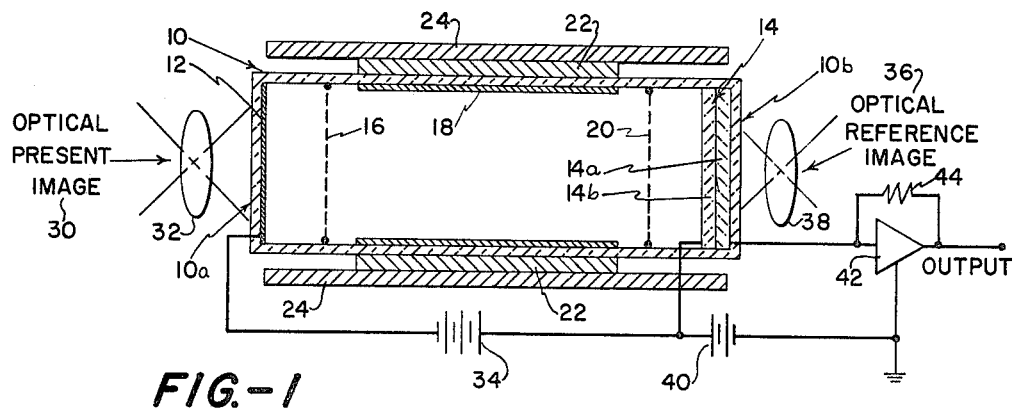
FIG. 1 is a schematic illustration of a correlation tube including the structure comprising a preferred embodiment of the invention.

With reference to the form of the invention illustrated in FIG. 1 of the drawings, the numeral 10 indicates generally an image tube housing which is substantially cylindrically shaped, preferably transparent at both ends 10a and 10b and having a photocathode surface 12 at the end 10a with a solid state correlator package or sandwich 14 at the other end 10b of the housing 10.

A field mesh 16 is utilized to provide a uniform acceleration to the electrons emitted from the photocathode 12, in the usual manner. A drift tube 18 is provided to give a uniform velocity to the electrons accelerated by the field mesh 16 towards the end 10b of the tube, again in the usual manner. An acceleration grid 20 is mounted between the end of the drift tube 18 and the solid state or sandwich package 14, again for the purpose of uniformly accelerating electrons into contact with the package 14.

In order to provide nutration of the electron beam passing through the drift tube 10, a nutation yoke 22 is provided and appropriately driven, as will be more fully explained hereinafter. A focus coil or yoke 24 surrounds the tube 10 throughout most of the length thereof to achieve a proper control and focus of the electron stream accelerated down the tube by appropriately controlled voltages on grids 16 and 20.

The operation of one embodiment of the invention is achieved by presenting an optical image 30 focused by an appropriate lens 32 onto the end 10a of tube 10 so that the photocathode 12 changes this optical image to an electron image for acceleration down the tube. Voltage within the tube is appropriate controlled from a power source 34 connected between the photocathode 12 and the face of the package 14. An optical reference image 36 is focused by means of an appropriate lens 38 onto the end 10b of tube 10 so that it impinges as an optical image onto the surface of the package 14a facing the end 10b. The package 14 is connected in a closed loop with a power source 40, and an amplifier 42 with a shunted resistor 44 whereby the amount of current passage through the package 14, as controlled by the number and position of photons entering the side thereof from face 10b and the number and position of electrons entering the opposite side thereof can be appropriately measured to give an electrical signal of correlation. The other embodiment of the invention as described later measures a voltage level within the package to determine correlation.

It should be understood that normally a reference film will make up the optical reference image 36, while a real-time scene makes up the optical present image 30. The package or sandwich 14 in actual function comprises a solid state electron multiplier stage 14a and an excitation-storage photoconductor 14b. The actual physical makeup of these components of package 14 will be more fully described hereinbelow.

Figures 2, 3:
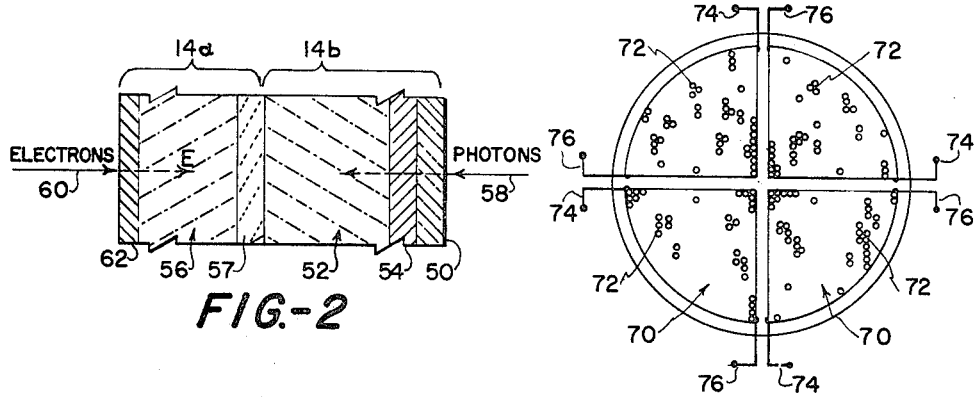
FIG. 2 is a greatly enlarged, cross-sectional illustration of the solid state storage sandwich wherein correlation is achieved.
FIG. 3 is an end elevation of the solid state sandwich showing the relation of the segments, and the electrode interconnection therebetween.

The solid state electron multiplier 14a and photoconductor 14b which act to provide a product over sum correlation are presented in more detail in FIG. 2. In structure, FIG. 2 illustrates that the excitation-storage photoconductor 14b comprises a substrate layer 50, which might be glass, or any other insulating type layer to provide strength to the sandwich. The thickness (typically ⅛ to ¼ inch) of this layer depends only upon strength requirements. The photoconductor layer is 52, and a suitable electrically conducting interface 54 is provided between the photoconductor layer and the substrate layer 50. The electron-multiplier section 14a includes an electron-sensitive layer 56, which is physically separated from the photoconductive region 52 by a suitable conductive region 57. A current will be passed through the layers 56 and 52 in accordance with the alignment and intensities of the incident photons in the layer 52 and incident electrons in the layer 56. An electrically conductive layer 62 is provided in laminated relationship to the other side of the sensitive region layer 56.

In effect, what occurs in the electron-multiplier sections or layers 52 and 56 is that the electrons from the photocathode or other electron source are electromagnetically or electrostatically projected or focused down the tube and caused to penetrate into the electron-sensitive regions E, but not into the photosensitive region 52; the photons of the optically focused image are caused to penetrate from the other side of the sandwich to the photoconductor layer 52 which thereby influences the current transfer characteristics of the adjacent regions 56, but not into the regions E. Each incident electron dissipates its energy in its respective sensitive region E by producing a number of electron-hole pairs in the region E which is proportional to the ratio of the incident beam energy to the ionization potential of the semiconductor material. Photons absorbed in the layer 52 produce electron-hole pairs therein in proportion to the incident light intensity. Material, doping, and thickness determine sensitivity, trapping characteristics, and excitation lifetimes.

An externally applied electric field then can cause current to pass through the layer 56 in direct proportion to the number of electron-hole pairs which are physically aligned in the respective layers 52 and 56. The current is high when both semiconductor materials are excited and the excitements are aligned, thereby generating a basic correlation signal, and there is negligible current when there is no alignment whatsoever.

Thus, it should be understood that the invention calls for the electron multiplication in the incident electron side of the package to be accomplished by incident electrons penetrating into an electron-sensitive region wherein minority carriers are trapped and the majority carriers add to the conduction during the lifetime of the trapped carriers.

FIG. 3 illustrates the preferable arrangement of the sandwich 14 into a plurality of segments 70, which preferably is at least four. Each segment contains one or more of the solid-state sandwich elements shown in FIG. 2 connected in parallel between the segment conductor layers 50 and 62 as seen in FIG. 2. Typically, the invention contemplates that a plurality of very small individual sandwiches, as shown by the small circles 72 in FIG. 3 may be utilized, or each quadrant segment may be of uniform cross section and in effect comprises a large solid state sandwich. In the embodiment shown in FIG. 3, the segments are each electrically connected in parallel so that with the four quadrants indicated in FIG. 3, some discrimination can be made in relation to the amount of current passage through each quadrant, thereby providing information about X and Y coordinates to achieve a proper correlation, as will be more fully defined hereinbelow. In any event, to achieve the parallel electrical relation each segment has an input electrical connecting line 74 and an output electrical connecting line 76. In the embodiment of FIG. 3 there must be four separate amplifiers 42 and shunted resistors 44 as shown in FIG. 1, with each of these separate outputs being sent into the phase discriminator 8 of FIG. 4.

Figure 4:
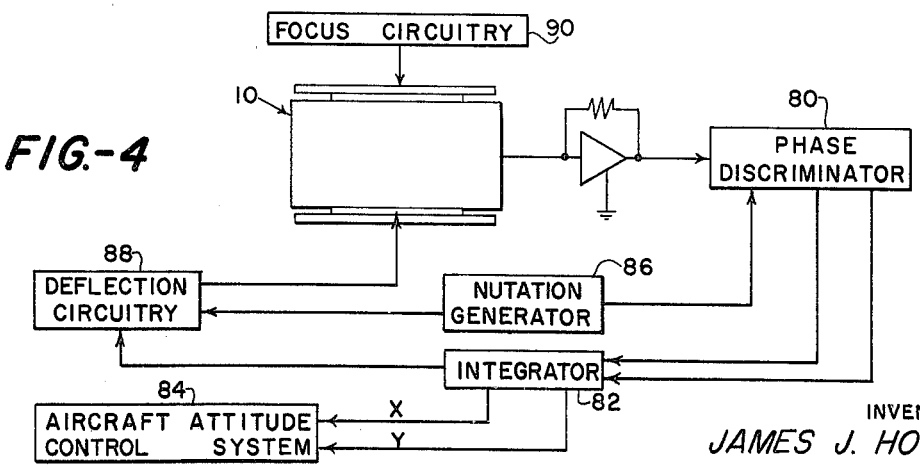
FIG. 4 is a block diagram, schematic illustration showing the components necessary to achieve the correlation utilizing the tube of the invention.

A correlation with the tube of the invention is achieved as shown in FIG. 4 of the drawings. Specifically, the outputs from each of the four quadrants of the sandwich 14, as shown in FIG. 3, after passing through their own amplifier are fed into a phase discriminator 80. The discriminator 80 sends its results to an integrator 82 where X and Y error signals are sent to an aircraft attitude control system 84 to correct the aircraft flight path to coincide with some predetermined reference path in the form of a movie film, or the like. In order to achieve proper phase relationship of the phase discriminator 80, a nutation generator 86 provides an input thereto, and also to the deflection circuitry 88. The deflection circuitry 88 also receives an input from integrator 82 to control the deflection of the normally nutated electronic beam projected down the tube 10. Naturally, focus circuitry as indicated by block 90 is utilized to properly focus the electron beam onto the solid state sandwich 14 within the tube 10. It should be understood that this type of circuitry to achieve the correlation as a result of phase, and the particular current readings from each of the segments of the solid state sandwich is conventional as shown in the above-identified patent and patent application.

While it should be understood that the object of the invention is to achieve correlation by matching current carriers as created by the impinging electrons of the present image and the impinging photons of the reference image within any solid state sandwich by a physical alignment of the current carriers creating the ability of the semiconductor materials to pass more or less current, the actual structure of the sandwich to achieve this effect can be accomplished with many materials of various properties and costs. However, in order to understand some specific structural concepts for accomplishing the objects of the invention, reference should be had to FIGS. 5-8. Particularly, with reference to FIG. 5, the substrate layer 50a is normally a glass, plastic, or the like. An electrically conductive layer of tin oxide 52a is vapor deposited or otherwise appropriately applied to the inner surface of the substrate 50a. The layer 52a will have a thickness of about .1 micron.

A photosensitive material comprises a layer of cadmium sulfide 54a. An electron-multiplier region comprises a plurality of individual electron-multiplier sections 56a having individual electrically conductive interface surfaces 54a mounted in insulated relationship to each other be small layers I between sections. Of course, the smaller the individual sections 54a and 56a are in physical size, and the closer or thinner the insulation between sections is, the greater or better the resolution. The resolution desired for the tube of the invention is preferably a thousand sections per lineal inch.

Depending upon the materials utilized in the sandwich, the current passage is within tolerances a direct indication of the degree of correlation. Preferably the material will not be such that there will be no current passage until the amount of alignment equals some predetermined percent, and then a maximum current passage above that point, but rather there will be a gradation of current passage depending upon the amount of correlation, with this gradation following a straight proportional relationship from no current passage at no correlation to a maximum current passage at maximum correlation.

Figure 5:
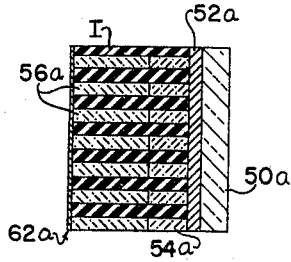
FIG. 5 is an enlarged, cross-sectional illustration of a modified embodiment of the solid state sandwich to achieve the objects of the invention.
Figure 6:
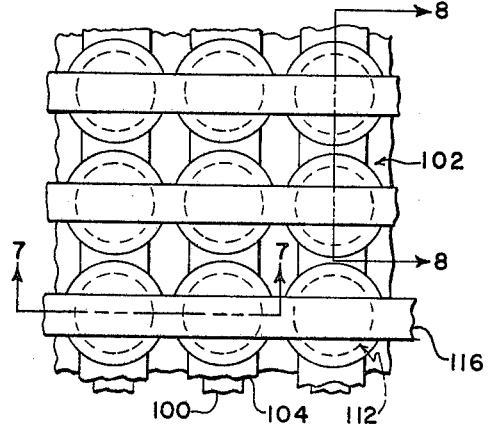
FIG. 6 is a plane view of a section of the solid state sandwich showing a configuration of individual isolated elements.
Figure 7:
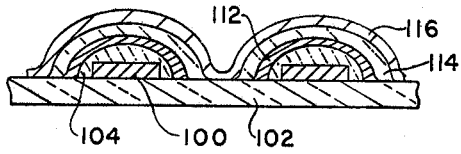
FIG. 7 is a cross-sectional illustration of the sandwich of FIG. 6 taken on line 7—7 thereof.
Figure 8:
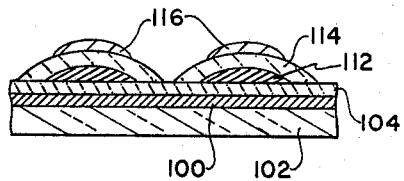
FIG. 8 is a cross-sectional illustration of the sandwich of FIG. 6 taken on line 8—8 thereof.

One technique to fabricate the type of structure shown in FIG. 5 is that shown in FIGS. 6, 7, and 8. Essentially, it comprises the following steps:

(1) Use conventional wire grid masking techniques to place strips of metal 100 down on substrate 102. (Thickness=1000–3000 angstroms, width=0.5–2 mils, width between strips =1 to 4 mils.)

(2) Use conventional wire grid techniques to place down photosensitive semiconductor in strips 104 on top of conducting strips 100. (Thickness=0.5–5 microns, width=0.5–1 mil wider than metal strips 100 such that the metal strips 100 are completely encapsulated). Semiconductor materials may be selected from a group including CdS, CdTe, PbS, GaAs, CdS, CdSe, and the like.

(3) Cover entire surface with photoresist and expose islands over strips, using subsequent conventional grid masking techniques.

(4) Using grid masking, increase thickness of photosensitive materials in regions 110 to 5–50 microns at the islands.

(5) Place conducting material over islands to produce conductive islands 112 using the grid mask. (Thickness=1000–10,000 angstroms, width .5–2 mils.)

(6) Place electron-multiplication materials 114 on top of the metal islands 112 such that the metal islands are completely encapsulated. The thickness of the entire multiplier 114 shall be 0.5–10 microns. Materials may be selected from those listed in Step 2.

(7) Remove the photoresist materials separating the islands by conventional removal techniques.

(8) Using conventional bar-grid masking techniques, deposit thin conducting strips 116 over islands 112 perpendicular to the strips deposited in step 1. The thickness shall be 1000–3000 angstroms and the width of each strip shall be 0.5–2 mils, or the same as with strips 100.

The conducting islands 112 and strips 116 of steps 5 and 8, respectively, may also be used as the N materials of step 6 to form diode and/or transistor multipliers 114 in the electron multiplier section. The conducting islands 112 may be used to form photodiodes with the material of Steps 2 and 4. The conducting islands 112 of step 5 and the conducting strips 100 of step 1 may be used to form phototransistors with the semiconductor of steps 2 and 4.

A primary mask shall be used on a 0.75 to 1.25 inch diameter substrate to form two or more major groups of element arrays. An element is defined as one stack of materials forming an island. Specifically, there shall be four groups of arrays to form quadrants as shown in FIG. 3. The strips of step 1 shall be connected together and the strips of step 8 shall be connected together in each quadrant. This may be done by placing conducting strips 74 and 76 (25–100 microns wide) as shown in FIG. 3. One conducting strip is connected to an electric potential referenced to an operational amplifier while the other strip is fed to the input of the operational amplifier. Thus, with the quadrant operation, four operational amplifiers are required.

The center-to-center distance between elements shall be 1–4 mils giving a resolution of 500–125 lines per inch, respectively.

It should thus be understood that the equivalent electrical circuit achieved by utilizing the current carrier combinations is nothing more than a pair of shunted resistance capacitance circuits in series, where the effective resistance must be reduced by the creation of electron-hole pairs in both circuits before there will be any passage through the circuit. Specifically, in such equivalent circuit, if one of the two resistance-capacitance networks is in a non-conducting state because its resistance is too high, and the other is conducting, the circuit automatically adjusts to potential levels in which recombination of electron-hole pairs occurs within the conducting element without an external current flow. Current flow only occurs when both circuits are conducting, which is the equivalent of matching current carriers substantially in alignment.

Figure 9:
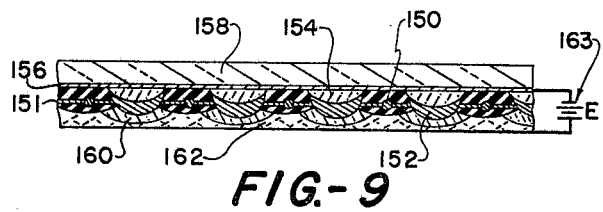
FIG. 9 is a cross-sectional illustration of a modified embodiment of the solid state sandwich to achieve the objects of the invention.
Figure 10:
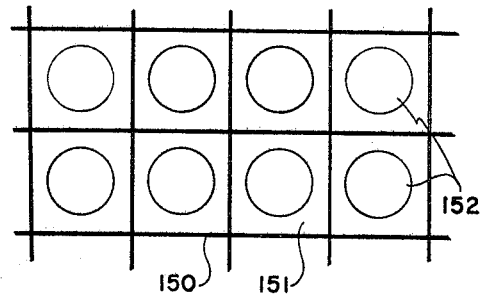
FIG. 10 is an enlarged plan view of a section of the modified embodiment of FIG. 9.
Figure 11:
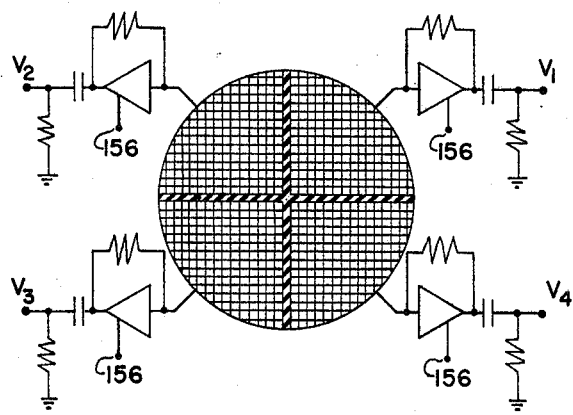
FIG. 11 is a plan view of the entire solid state package showing it divided into a plurality of conducting grids.

The basic scheme of correlation using diodes or transistors (photo or incident electron sensitive) in series (sensing the current) with photoconductors, photodiodes, or phototransistors, as explained for FIGS. 1–8 above, does not produce enough range in photon densities and/or incident electron densities to make such correlation the best possible over wide ranges. Two photoconductors (or an electron-sensitive conductor and a photoconductor) in series produce basically a product over sum correlation, but the response over broad ranges is not sufficiently high to be practical with higher nutational speeds. A modification to the solid state package is shown in FIGS. 9, 10, and 11. Specifically, this modification incorporates a conducting grid 150 connected electrically to island conductors 152 through a thin film resistive layer 151. Each island conductor 152 is mounted to a respective photoresistive mound 154. The mounds 154 are carried on an electrically conducting film 156 which in turn is carried by a glass substrate 158. Electron sensitive material 160 covers the remaining surface of each island conductor 152, and may be, for example, a p-type semiconductor. An n-type semiconductor layer 162 forms the outer surface of the package and, of course, cooperates with the material 160 to produce electron-hole pairs in a depletion region created by a reversed biased junction, and well known in the art. The bias is applied by the external potential E163. The regions 160 and 162 may also be made up to form transistor electron multiplier by making 160 a p-n junction.

FIG. 11 illustrates the package as a whole in plan showing that it is broken into quadrants with a separate amplifier associated with each quadrant to pick off a voltage which represents the combined voltage picked off by the conducting grid 150 associated with the respective quadrant. In essence the voltage picked off the total grid 150 is a sum of the voltages developed at each conducting island 152 and passed to the grid 150 through the resistive layer 151. This type of voltage summation thus becomes a quotient correlator which in effect compares the dividend of the incident electron current determined by the number of electron-hole pairs in the material 160 divided by the incident photo density in the mounds 154. The technique of summation from a parallel circuit is a standard analog computer technique. The use of grid 150 here provides the parallel circuit. Of course, alignment of the image elements is again necessary to create a voltage extremum at the island conductors 152 so that voltage can be picked off grid 150. While a thin resistor is illustrated in FIG. 10 to transfer the voltage from conductors 152 to grid 150, any suitable resistive electrical conductor would meet the objects of the invention. However, it is important to the operation of the package that the resistance of the layer 151 be at least ten times greater than the electrical resistance of the photoconductive material in mounds 154. The resistive layer 151 in this embodiment might be made from gold or nickel, or in some instances a tantalum film might be easier to deposit. Normally, its thickness will fall in the range of being between 100 to 1000 angstroms.

The modification shown in FIGS. 9–11 has the following advantages over the embodiments shown in FIGS. 1–8:

(1) Fast response of diode multipliers over photo or electron conductive cells.

(2) Practical from the standpoint that the resistive layer 151 can be and is naturally very high, thus making the correlator unsaturable over a wide range. Photoconductor correlators suffer from the fact that they are at best product over sum correlators and, therefore, saturate easily.

The principal advantages of all embodiments of the proposed tube over existing tubes in application to area-correlation guidance systems are:
(1) No erase time.
(2) Negligible reference-change time.
(3) Shorter tube.
(4) No storage mesh.
(5) Higher real-time electron-image resolution.
(6) Real-time control of the reference scene.

Also, the tube of the invention affords the opportunity to continuously update the reference scene perhaps by movie film. Predicated on this possibility are the following:
(1) The practicality of using an all electro-static tube, and
(2) The practicality of using stationary objective lens to focus the real-time scene on the photocathode.

In regard to FIG. 9, the p-n-junction diode 160, 162 (or npn or pnp transistor) form a current generator which generates a current proportional to the incident current from the photocathode 154. But the photocathode 154 is also basically a current generator. Thus, if (1) the bias potential is removed, (2) the n-type semiconductor 162 is removed, and (3) the p-type semiconductor 160 is changed to a conductor in FIG. 9, the modified device will act like the device of FIG. 9 with the exception of current gain produced by the diode or transistor electron multiplier. In the device of FIG. 9 so modified, FIGS. 10 and 11 would remain unchanged.

While in accordance with the patent statutes only one best known embodiment of the invention has been illustrated and described in detail, it is to be particularly understood that the invention is not limited thereto or thereby, but that the inventive scope is defined in the appended claims.

What is claimed is:

1. A device for achieving simultaneous area correlation which comprises:
an enclosed housing drawn to a vacuum, and optically sensitive at both ends,
a photo emissive cathode at one end of the housing to convert optical light images into electron images by the emission of electrons from the cathode,
means to focus and direct the path of the electrons emitted from the cathode representing an optical image down the housing toward the other end thereof,
a solid state sandwich positioned at said other end of said housing to receive the electrons directed down the housing, said sandwich comprising
at least one segment against containing a photosensitive and an electron sensitive semiconductive separated by a conducting material with the photosensitive semiconductor facing the other end of the housing such that electrons or photons electrostatically or electromagnetically projected and focused or optically focused on their respective surface of the sandwich penetrate into the sensitive regions of the semiconductor on that side of the sandwich to control the conduction of current through the sandwich, and
means to place a potential across the sandwich and instantaneously measure the current flow therethrough.

2. A combination according to claim 1 where the sandwich comprises a plurality of segments all insulated from each other, but where groups of segments comprising geometric portions of the sandwich are electrically connected in parallel whereby the current passage through each total group can be determined.

3. A combination according to claim 1 where the sandwich is a lamination consisting of an insulating transparent substrate, a transparent electrode deposited on the substrate, a photosensitive semiconductor deposited over the electrode, an interface conductor deposited over the photosensitive semi-conductor, an electron multiplication semiconductor deposited over the interface conductor, and an electrode transparent to electrons deposited over the electron multiplication semiconductor.

4. A combination according to claim 1 which includes a phase discriminator receiving as an input the measured current through the sandwich, means to nutate the electrons focused down the housing and coordinate the nutation with the phase discriminator, and means to integrate the output from the phase discriminator to generate error signals.

5. A combination according to claim 3 where each individual segment comprises a laminate of a photosensitive layer, an electron multiplier region adjacent the photosensitive layer, and a thin electrically conductive layer on the outer surface of each side of the laminate.

6. A combination according to claim 5 where the photosensitive layer is cadmium sulphide, and the electron multiplier region comprises P-N junction diodes.

7. A combination according to claim 5 wherein the electron multiplier region has high gain and fast response, but that the photosensitive layer has a slow response.

8. An electron tube for achieving a simultaneous area correlation between two images which comprises:
a tube housing drawn to a vacuum,
means adjacent one end of the housing which has the property to provide an image of electrons,
means to direct and focus electrons emitted from such means down the housing toward the other end,
means to focus an optical image on the other external end of the housing,
a solid state package mounted in the other end of the tube housing adapted on one surface to receive electrons projected down the housing and create electron-hole pairs within the package, and receive photons on the other surface and create electron hole pairs,
means to pass a current through the package whereby the resistance to current passage is dependent upon the alignment of electron hole pairs in the package from the electrons and photons respectively, and
means to continuously measure such current passage through the package to produce a simultaneous, continuous correlation signal of the two images.

9. A combination according to claim 8 where the solid state package is broken down into a plurality of individual segments, each of which passes electrical current dependent upon the aligned impingement of electrons and photons on opposite side thereof.

10. An electron tube for achieving simultaneous area correlation between two images which comprises:
a tube housing drawn to a vacuum,
means adjacent one end which has the property to convert photons into electrons,
means to direct and focus electrons emitted from the last said means down the housing toward the other end,
means to provide images at both external ends of the housing,
a solid state package mounted in the other end of the tube housing adapted on one surface to receive electrons projected down the housing and effect current generation at such points of electron reception within the package, and receive photons on the other surface and create electron-hole pairs, and
means to continuously detect and measure the voltage level across the photon-excited side or the electron-excited side within the package to generate a simultaneous correlation signal of the two images.

11. A combination according to claim 10 where the solid state package is broken down into a plurality of individual segments, each of which has an internal voltage level dependent upon the aligned impingement of electrons and photons on opposite sides thereof.

References Cited

UNITED STATES PATENTS

| | | | |
|---|---|---|---|
| 3,182,223 | 5/1965 | McNaney | 315—10 |
| 3,322,955 | 5/1967 | Desvignes | 313—66 X |
| 3,349,231 | 10/1967 | Harmon | 324—77 X |

RODNEY D. BENNETT, Jr., Primary Examiner

J. P. MORRIS, Assistant Examiner

U.S. Cl. X.R.

250—211; 313—66; 324—77